(12) United States Patent
Roeder et al.

(10) Patent No.: US 11,330,875 B1
(45) Date of Patent: May 17, 2022

(54) MULTI-PRONGED SNAP CHARM

(71) Applicant: Spark Jewelry LLC, West Chester, PA (US)

(72) Inventors: Bradley David Roeder, West Chester, PA (US); Catherine Mary Roeder, West Chester, PA (US); Michele Lynn Robins, West Chester, PA (US); Maria Kalogredis Weede, West Chester, PA (US)

(73) Assignee: Spark Jewelry LLC, West Chester, PA (US)

( * ) Notice: Subject to any disclaimer, the term of this patent is extended or adjusted under 35 U.S.C. 154(b) by 30 days.

(21) Appl. No.: 16/677,559

(22) Filed: Nov. 7, 2019

Related U.S. Application Data (60) Provisional application No. 62/757,394, filed on Nov. 8, 2018.

(51) Int. Cl.
*A44C 25/00* (2006.01)
*A44C 5/00* (2006.01)

(52) U.S. Cl.
CPC .......... *A44C 25/007* (2013.01); *A44C 5/0007* (2013.01); *F16B 2200/10* (2018.08)

(58) Field of Classification Search
CPC ............ A44D 2201/06; A44D 2201/04; A44B 17/0023; A44B 17/0029; A44B 1/38; Y10T 24/45775; Y10T 24/45785; Y10T 24/366; Y10T 24/3657; F16B 21/071; F16B 21/086; F16B 21/07; F16B 21/073; F16B 2200/10; A44C 25/007; A44C 17/0208; A44C 5/0007; A44C 5/2052; A44C 5/2071

See application file for complete search history.

(56) References Cited

U.S. PATENT DOCUMENTS

| | | | | |
|---|---|---|---|---|
| 3,673,911 | A * | 7/1972 | Ramillon | A63C 11/24 411/533 |
| 3,691,597 | A * | 9/1972 | Kahn | A44B 1/34 24/108 |
| 3,785,010 | A * | 1/1974 | Owen | A44B 1/32 24/114.4 |
| 5,448,809 | A * | 9/1995 | Kraus | F16B 21/02 24/453 |
| 2009/0007597 | A1* | 1/2009 | Hanevold | G09B 19/00 63/1.14 |
| 2011/0236156 | A1* | 9/2011 | Rottinghaus | F16B 21/086 411/508 |
| 2013/0074545 | A1* | 3/2013 | Moloney | A44C 25/007 63/3.1 |

(Continued)

FOREIGN PATENT DOCUMENTS

| | | | | |
|---|---|---|---|---|
| DE | 668843 C | * | 12/1938 | ............ F16B 9/05 |
| FR | 2933472 A1 | * | 1/2010 | ............ F16L 3/13 |

*Primary Examiner* — Emily M Morgan
(74) *Attorney, Agent, or Firm* — Elman Technology Law, P.C.; Gerry J. Elman (57) ABSTRACT

The present disclosed subject matter relates to a snap charm comprising a detachable stud and a detachable charm, with a stud head being formed of eight arms extending from the stud body in the shape of an eight-pointed star, the stud and charm each having a connecting means which matingly engage and allow for the anchoring of a variety of charms to objects such as a bracelet, flip-flop, sandal strap, or a strap for a backpack.

9 Claims, 8 Drawing Sheets

(56) References Cited

U.S. PATENT DOCUMENTS

| | | | | |
|---|---|---|---|---|
| 2015/0096328 A1* | 4/2015 | Schwartz | ........... | A44C 15/0015 |
| | | | | 63/1.13 |
| 2015/0296935 A1* | 10/2015 | Rana | .................... | A44C 5/0007 |
| | | | | 63/3 |
| 2020/0128927 A1* | 4/2020 | Beatty | .................. | A44C 5/0015 |

* cited by examiner

MULTI-PRONGED SNAP CHARM

CROSS-REFERENCE TO RELATED APPLICATIONS

This non-provisional application claims benefit of priority to U.S. Provisional Patent Application 62/757,394, filed Nov. 8, 2018. The entire disclosure of the aforementioned application is incorporated herein by reference.

BACKGROUND OF THE INVENTION

The oldest-surviving snap dates to more than two thousand years ago in China, and it is widely believed that the snap was invented there. In the 1880s, the modern form emerged in Europe and has gone on to be one of the most useful fasteners in the world, especially in clothing and fabrics. However, there is ample room for innovative, aesthetically-pleasing snaps.

SUMMARY OF THE INVENTION

In accordance with the invention, a snap charm is provided, with a stud and a charm. The male stud has a body and a head. The head of the male stud is formed in the shape of an eight-armed star, with the arms of the star perpendicular to the body of the stud. The arms form a regular eight-point star, with each arm oriented 45 degrees from the two adjacent arms. Four of the arms are long, four are short. The long arms are arranged as a cross; the short arms are also arranged as a cross and oriented 45 degrees offset from the long arms.

The charms have two sides: one is decorative, the other has a female receiver to interface with the male stud. The female receiver has an eight-point star shape with long and short openings to interface with the long and short arms of the head of the male stud. The charms may have any shape consistent with the operation of the female receiver.

The male stud is desirably made of a hard, non-deformable material such as metal or hard plastic. The receiver may be made of the same material but is preferably of soft plastic such as polyvinyl chloride, or a rubbery material. The particular shape and dimensions of the receiver are dependent on whether it is made of a deformable material such as rubber or plastic, as in preferred embodiments of the invention, or a less-deformable material. The rest of the charm may, but need not, be made of the same material as the receiver.

The studs may be anchored by any means known in the art to objects such as a bracelet, a flip-flop or sandal strap, a strap for a backpack, etc.

One aspect of the invention is a snap charm comprising:
a stud comprising:
 a stud body, and
 a stud head, the stud head being formed of eight arms extending from the stud body in the shape of an eight-pointed star; and
a charm having a receiver on one side formed in the shape of an eight-pointed star;
wherein the charm is attached to the stud by bringing the receiver and the stud head together.

Another aspect of the invention is the snap charm as disclosed above, wherein each arm of the stud head extends at substantially regular angles to the two most adjacent arms.

Another aspect of the invention is the snap charm as disclosed in any aspect above, wherein four of the arms are longer than the other four arms.

Another aspect of the invention is the snap charm as disclosed in any aspect above,
wherein the four long arms extend from the body of the stud at regular angles to one another,
wherein the four short arms extend from the body of the stud at regular angles to one another,
and wherein each long arm extends directly adjacent to two short arms and each short arm extends directly adjacent to two long arms.

Another aspect of the invention is the snap charm as disclosed in any aspect above, wherein the stud is made of rigid material, such as hard plastic or metal, and the receiver is made of deformable material, such as soft plastic, e.g. PVC, or a rubbery material.

Another aspect of the invention is the snap charm as disclosed in any aspect above, further comprising:
eight long arm pegs disposed within the charm opening,
 each long arm peg having an inner long arm edge and an outer long arm edge,
 the long arm pegs being disposed in pairs such that the inner long arm edges of each long arm peg of each pair surround and define long arm peg spaces; and
four short arm pegs disposed within the charm opening,
 each short arm peg having two lateral short arm ends;
wherein each outer long arm edge is proximate to one lateral short arm end, and wherein the outer long arm edges and later short arm edges surround and define long-short peg spaces;

One aspect of the invention is a snap charm bracelet comprising:
a strap;
at least one stud attached to the strap, the at least one stud comprising:
 a stud body; and
 a stud head, the stud head being formed of eight arms extending from the stud body in the shape of an eight-pointed star;
and at least one charm having a receiver on one side formed in the shape of an eight-pointed star;
wherein a wearer can attach the at least one charm to the at least one stud by bringing the receiver and the stud together.

The invention may be implemented to provide a bracelet comprising a strap with multiple interchangeable charms.

Charms in accordance with the present invention may be produced so as to be interchangeable with each other and matingly engageable with any of a multiplicity of studs in a particular set. Thus they may be rearranged by the wearer at will and collected and traded as fashion items.

DETAILED DESCRIPTION

Figure 1:
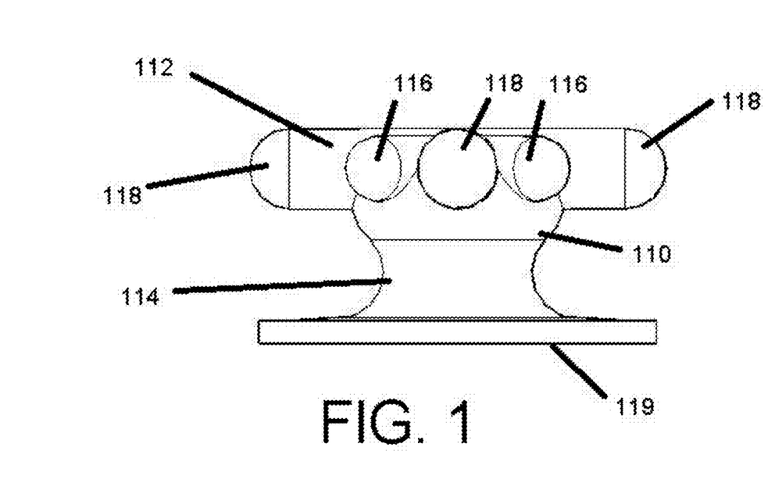
FIG. 1 is an elevation view of the side of a stud of the invention.
Figure 2:
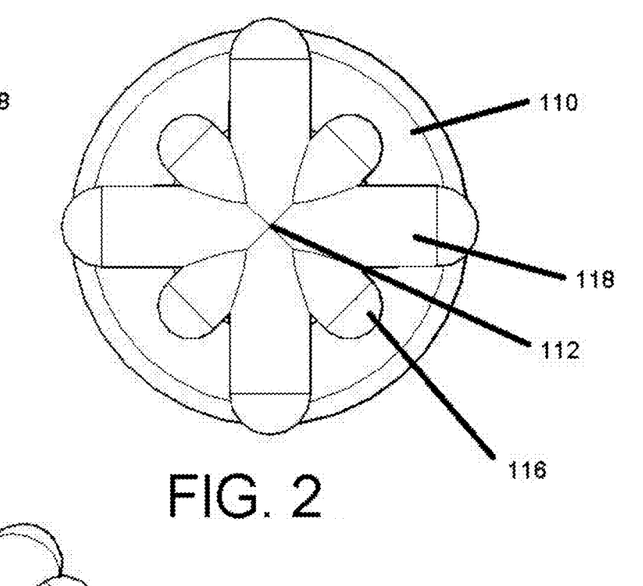
FIG. 2 is a plan view of the head of the stud of FIG. 1.

FIG. 1 illustrates an embodiment of the stud 110 of the invention. The stud 110 has a body 114 and a head 112. The head 112 is shaped as an eight-pointed star. The arms 115 of the star extend at substantially regular angles to one another, i.e., forty-five degrees or one-fourth pi radians between adjacent arms 115. The arms 115 extend substantially perpendicular to the body 114 of the stud. When the base 119 of the stud 110 is placed on a flat surface, the arms 115 extend parallel to the plane of the surface.

In preferred embodiments, as illustrated here, four of the arms are long 118 and four are short 116. The long arms 118 extend at substantially regular angles to one another: ninety degrees or one-half pi radians between two long arms 118. The long arms 118 could also be said to be formed in a + or x shape.

Further, in preferred embodiments, the short arms 116 extend at substantially regular angles to one another: ninety degrees or one-half pi radians between two short arms 116. The short arms 116 could also be said to be formed in a + or X shape.

The long arms 118 and short arms 116 are positioned so that they alternate between long and short. It could also be said that the two sets of arms 115 are positioned forty-five degrees or one-fourth pi radians offset from one another.

Figure 3:
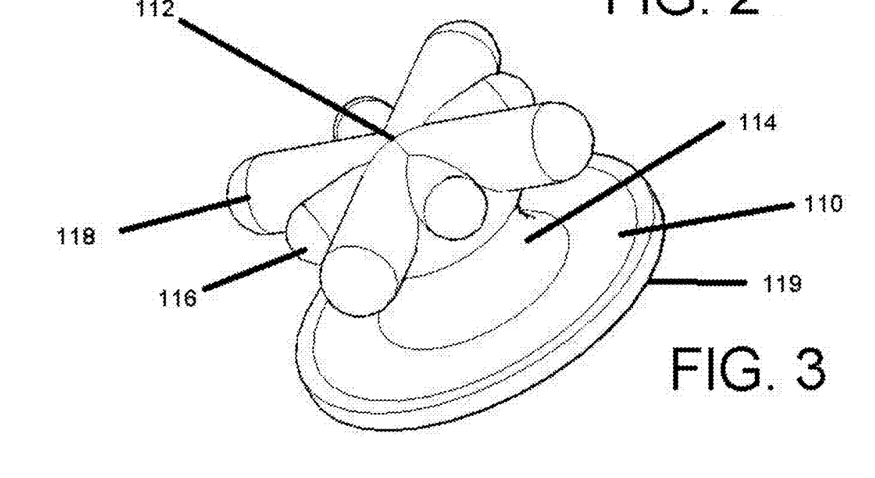
FIG. 3 is an isometric overhead view of the stud of FIG. 1.
Figures 4, 5, 6:
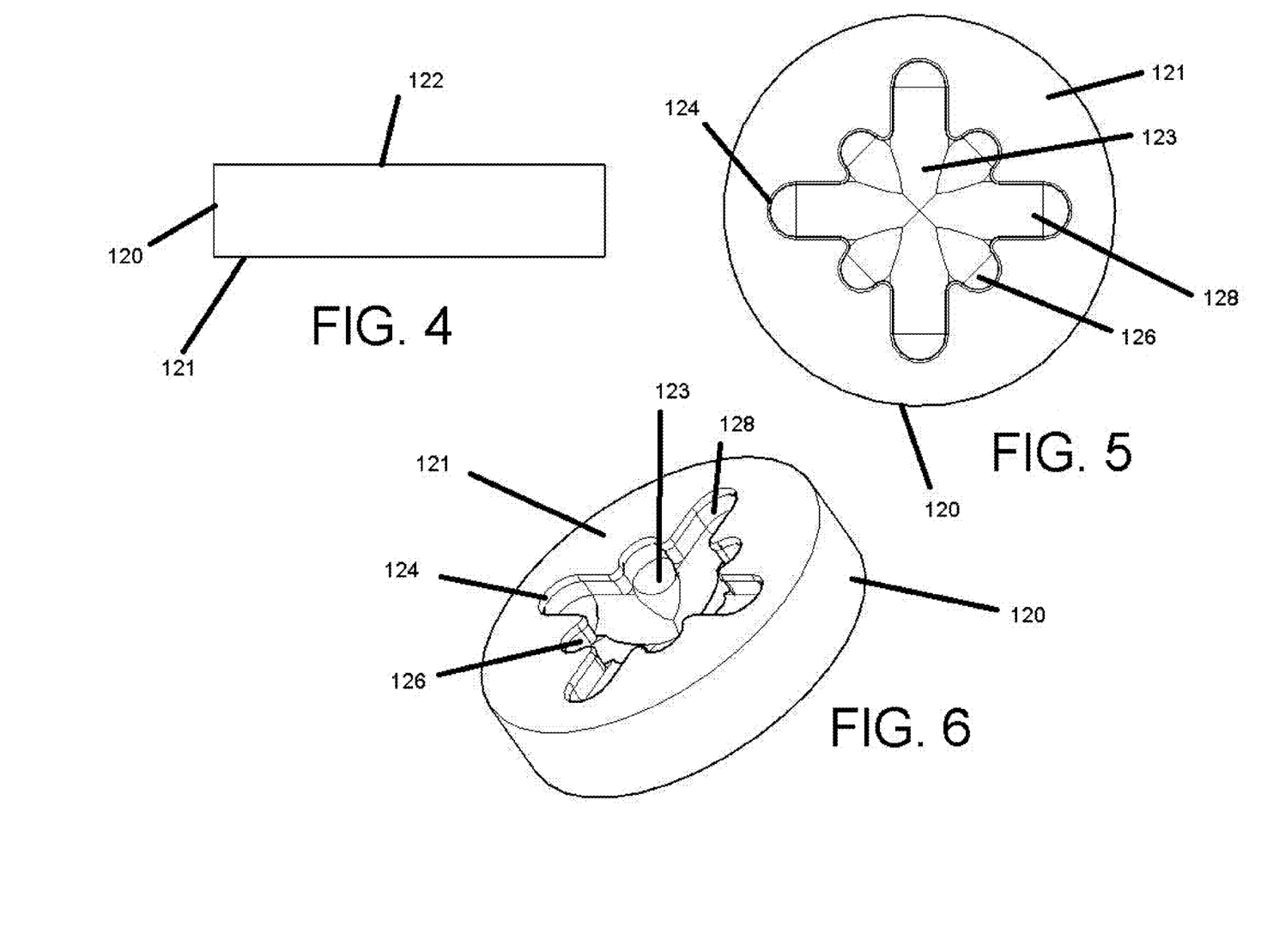
FIG. 4 is an elevation view of the side of a charm of the invention.
FIG. 5 is a plan view of the functional side of the charm of FIG. 4.
FIG. 6 is an isometric view of the functional side of the charm of FIG. 4.

FIGS. 3 and 4 show the preferred embodiment of the stud 110 from an overhead and an isometric viewpoint. The respective lengths of the arms 115 and their positions with respect to each other are illustrated.

The stud 110 may be made of metal or plastic. The material of the stud 110 determines which embodiment of the charm 120, 220 is to be used.

FIG. 5 illustrates an embodiment of the charm 120 from the side. The charm 120 is made of plastic and is formed to mate with the plastic embodiment of the stud 110.

The charm 120 has two sides. The top side 122 is decorated as desired. FIG. 6 illustrates the charm 120 from directly over the bottom side 121. The bottom side 121 is undecorated and has a stud receiver opening 123 to accept the head 112 of the stud 110. The stud receiver opening 123 is shaped similarly to the head 112 of the stud: an eight-pointed star. As in the preferred embodiment of the head 112, the receiver opening 123 is shaped with long arms 128 and short arms 126.

Although the drawings illustrate a plain, circular charm, the charm 120 may be formed in any shape or decorated in any manner consistent with the mating of the stud receiver opening 123 and stud 110.

Figure 7:
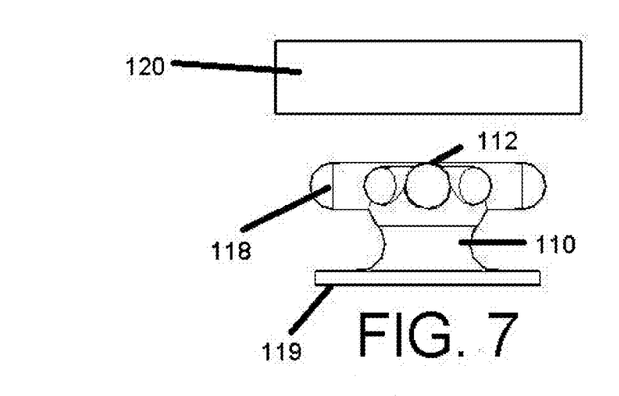
FIG. 7 is an elevation view of a stud and a charm of the invention, showing the stud and charm positioned for connection.

FIG. 7 illustrates the charm 120 in isometric perspective, showing the depth of the receiver opening 123 and the long arms 128 and short arms 126.

Figure 8:
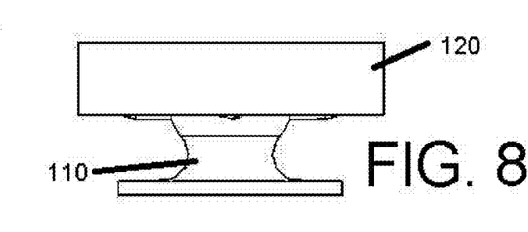
FIG. 8 is an elevation view of the stud and charm of FIG. 7, showing the stud and charm connected.

FIG. 8 illustrates a stud 110 and a charm 120 of the invention positioned for connection. They are positioned so that the head 112 of the stud and the stud receiver opening 123 are aligned. To connect the charm 110 and the stud 120, the user pushes the head 112 of the stud 110 into the stud receiver opening 123 of the charm 120. The pressure causes the head 112 of the stud 110 and/or the lip 124 of the stud receiver opening 123 to deform, so that the head 112 can pass the lip 124 of the opening. Once the head 112 passes the lip 124, the head 112 and/or the lip 124 rapidly return to their original shape(s). The rapid return produces the characteristic "snap" sound.

Figure 9:
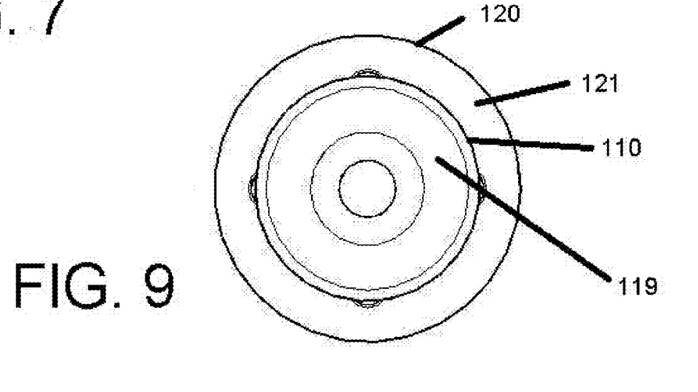
FIG. 9 is a plan view of the stud and charm of FIG. 7, showing the stud and charm connected, from the underside of the stud.
Figure 10:
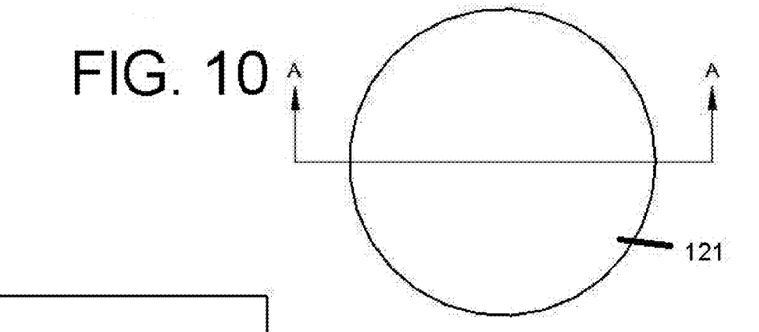
FIG. 10 is a plan view of the stud and charm of FIG. 7, showing the stud and charm connected, from the decorative side of the charm.
Figure 11:
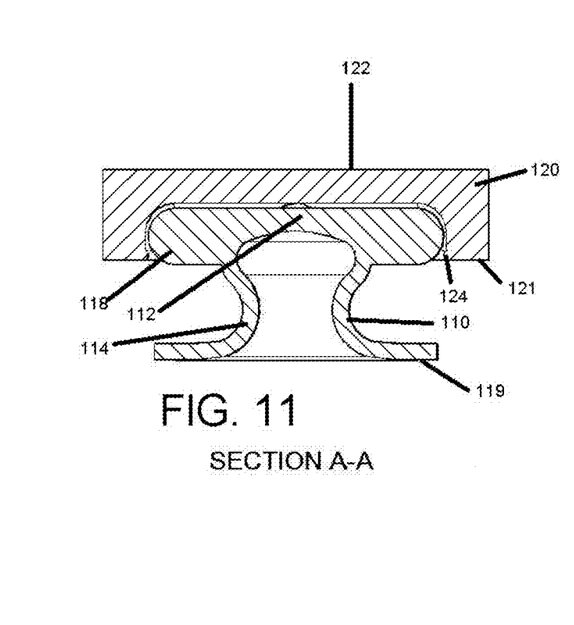
FIG. 11 is a plan cross-section view of the stud and charm taken along the A-A line of FIG. 10.

FIG. 9 illustrates the stud 110 inserted into the charm 120 from their sides. FIG. 110 illustrates the stud 110 inserted into the charm 120 from the bottom 119 of the stud 110 and the underside 121 of the charm 120. FIG. 11 illustrates the top side 122 of the charm 120; when the charm 120 is attached to the stud 110, the stud 110 is obscured by the charm 120 when someone looks directly at the top side 122.

Figures 12, 13:
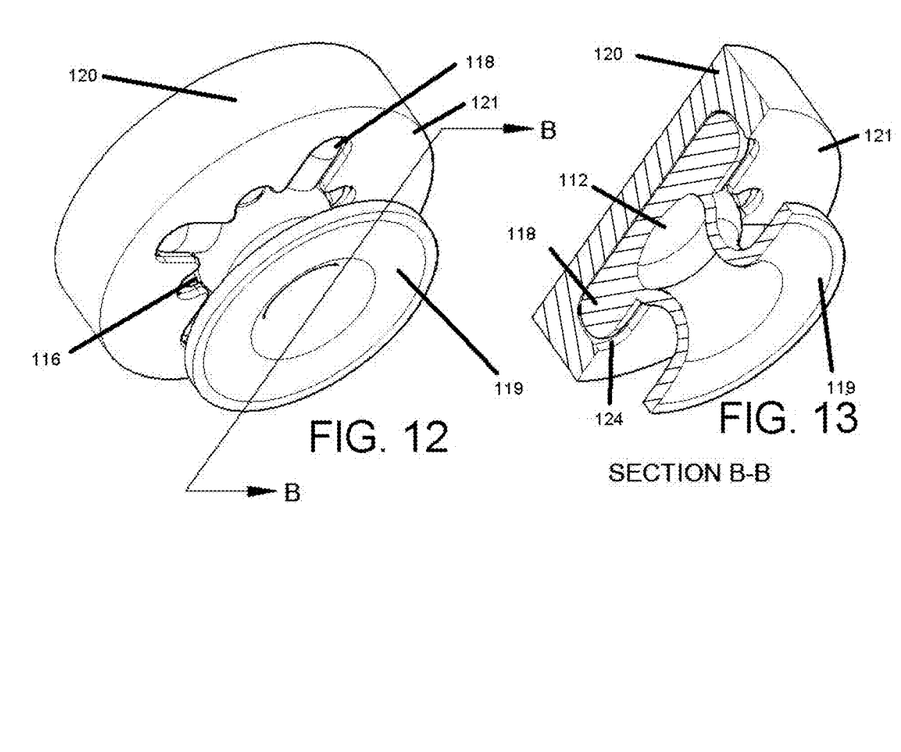
FIG. 12 is an isometric view of the undersides of the stud and charm of FIG. 7, showing the stud and charm connected.
FIG. 13 is an isometric cross-section view of the undersides of the stud and charm, taken along the B-B line of FIG. 12.

FIG. 12 illustrates the stud 110 inserted into the charm 120 from the side. FIG. 112 is a cross-section illustration taken along the A-A line of FIG. 11. The head 112 of the stud 110 is resting in the receiver opening 123 of the charm 120. Due to the lip 124, the head 112 does not simply slip out of the opening 123.

Figure 14:
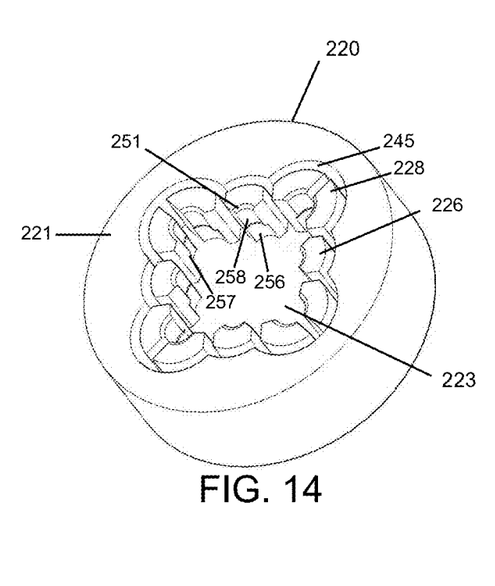
FIG. 14 is an isometric view of the underside of an alternative embodiment of the charm of the invention.

FIG. 13 illustrates the stud inserted into the charm 120 from an isometric view, showing both the body 114 and the bottom 119 of the stud 110 and the underside 121 of the charm 120. FIG. 14 is a cross-section of FIG. 13, taken along the line B-B.

To detach the charm 120, the user pulls the charm 120 away from the stud 110. The head 112 and/or lip 124 will deform, allowing the head 112 to pass the lip 124. Once the head 112 passes the lip 124, the head 112 and/or the lip 124 return to their original shape(s), and the stud 110 and the charm 120 are separated. Thus, in accordance with the invention, a charm 120 is detachably secured to the stud 110.

Figure 15:
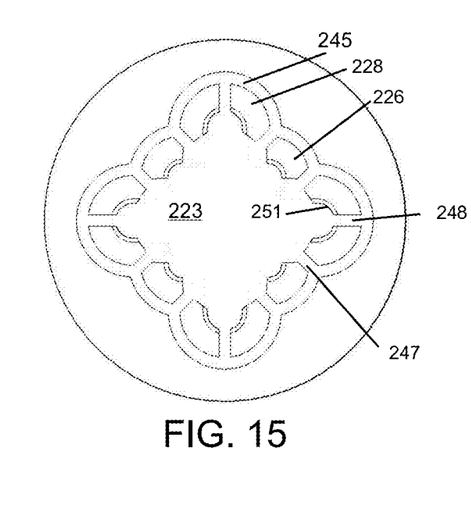
FIG. 15 is a plan view of the underside of an alternative embodiment of the charm of the invention.

FIG. 15 illustrates another embodiment of the charm 220. The charm 220 is made of metal, and it is formed to matingly engage a metal embodiment of the stud 110.

FIG. 15 illustrates that within the charm opening 223 are long arm receiver pegs 228 and short arm receiver pegs 226. The long arm receiver pegs 228 are formed to receive the tips of the long arms 118 of the stud 110. The long arm receiver pegs 228 are arranged in pairs, two per long arm 118 of the stud 110, with a small space 248 between the two long arm pegs 228. The small space 248 between the two long arm receiver pegs 228 allows the long arm receiver pegs 228 for each long arm 118 to deform away from each other when receiving the long arm 118 of the stud 110.

The short arm receiver pegs 226 are arranged to receive the tips of the short arms 116 of the stud 110. Unlike the long arm receiver pegs 228, there is one short arm receiver peg 226 per short arm 116 of the stud 110.

The long arms receiver pegs 228 are separated from the short arm receiver pegs 226 by a small space 247. This long-short peg space 247 allows the long arm receiver pegs 228 and short arm receiver pegs 226 to deform relative to one another when receiving the stud 110.

FIG. 15 also illustrates that the lower central edges 251 of the long arm receiver pegs 228 and short arm receiver pegs 226 is beveled. The beveled edges 251 facilitate the entry of the stud 110 into the charm opening 223.

Also illustrated is a small space 245 between the receiver pegs 226, 228 and the remainder of the underside 221 of the charm 220. This peg lateral deformation space 245 allows the long arm receiver pegs 228 and short arm receiver pegs 226 to deform away from the center of the charm opening 223 to allow the stud 110 to be inserted into the charm 220. Whenever desired by the wearer, the charm 220 may be removed from its mating engagement with a stud 110 by the careful application of finger force or a prying instrument. This allows the charms of the present invention to be rearranged and interchanged to provide varied looks at different times.

As in the soft embodiment, the circular shape of the charm 220 is for illustrative purposes only. The charm 220 may have any shape or be decorated in any style consistent with the operation of the charm/stud mating.

FIG. 14 illustrates the underside 221 of the charm 220 from an isometric view. As in FIG. 15, FIG. 14 illustrates the long arm receiver pegs 228 and short arm receiver pegs 226. The small space 248 between the long arm receiver pegs 246 is illustrated, as is the long-short peg space 247.

From this perspective, the shape of the individual pegs 226, 228 can be more easily seen. Both receiver pegs 226, 228 have a lower portion 256 and an upper portion 258. The lower portions 256 of both receiver pegs 226, 228 are thicker than the upper portions 258. Each peg has a shoulder 257 at the transition between lower portion 256 and upper portion 258. The purpose of the shoulder 257 is to keep the stud 110 within the charm 220 once the stud 110 has been inserted.

To insert the metal stud 110 into this embodiment of the charm 220 in this embodiment, the stud 110 and charm 220 are positioned relative to each other as illustrated in FIG. 8. The wearer, or human user, then brings them together. The receiver pegs 226, 228 in the charm 220 deform away from the center of the underside 221 of the charm 220 towards its edges, and the pairs of long arm receiver pegs 228 deform away from each other. The arms 116, 118 of the stud 110 travel past the shoulders 247 of the receiver pegs 226, 228, and the receiver pegs 226, 228 quickly revert to their original position, trapping the arms 116, 118 of the stud 110 between the shoulders 247 of the pegs 226, 228 and the roof 229 of the charm opening 223.

Figure 18:
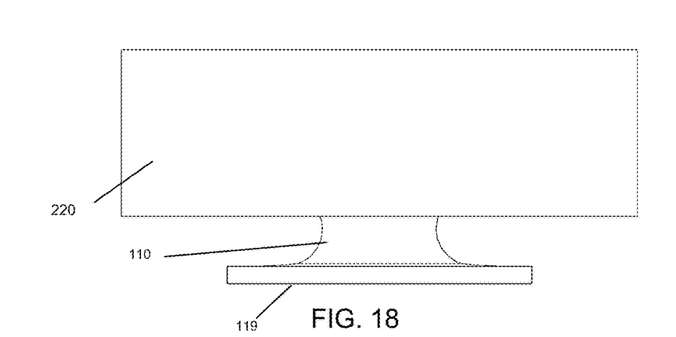
FIG. 18 is an elevation view of a stud and an alternative embodiment of the charm of the invention, showing the stud and charm connected.

FIG. 18 shows a metal embodiment of the invention once the stud 110 and charm 220 have been snapped together. The body 114 of the stud 110 and the side of the charm are 220 visible, as are the decorative side 222 and underside 221 of the charm 220.

Figure 19:
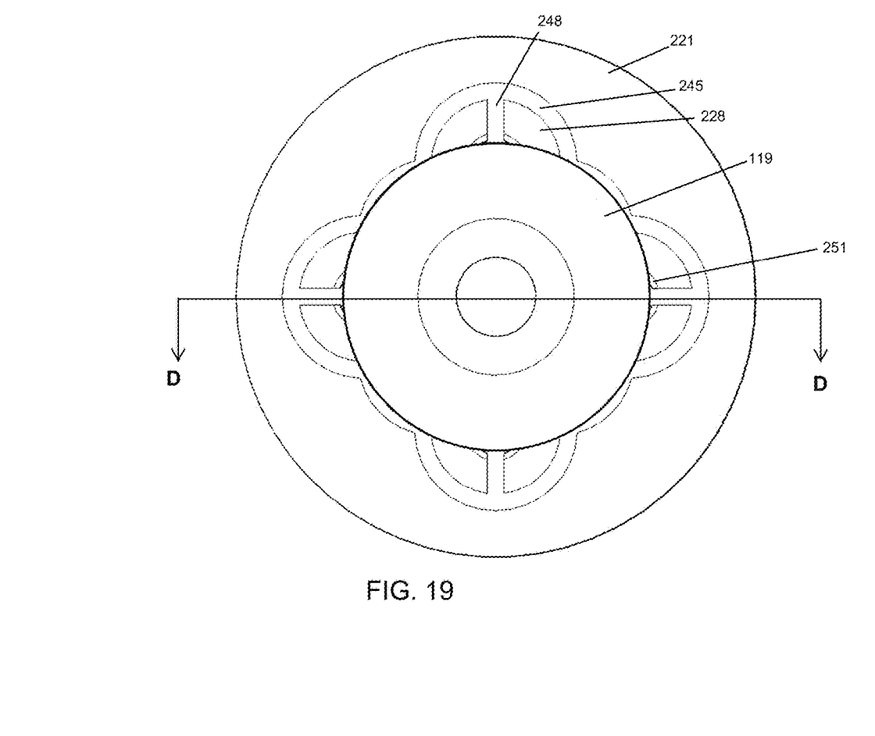
FIG. 19 is a plan view of the underside of a stud and an alternative embodiment of the charm of the invention, showing the stud and charm connected.
Figure 20:
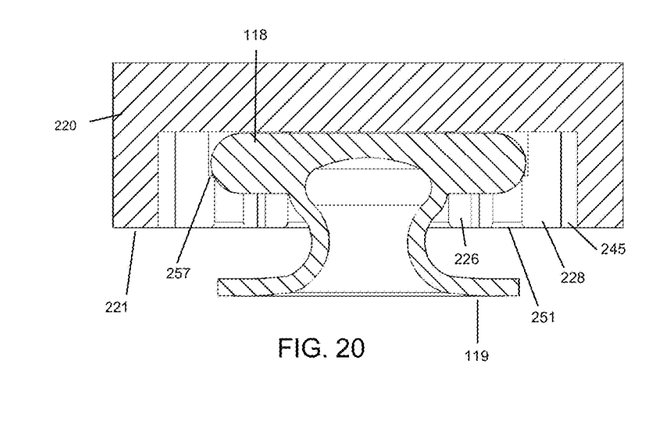
FIG. 20 an elevation view of a stud and an alternative embodiment of the charm of the invention, showing the stud and charm connected, taken along the D-D line of FIG. 19.

FIG. 20 is a cross-section of FIG. 19 taken along the section line C-C. In this cross-section, two long arms 118 of the stud 110 are illustrated. Two long arm receiver pegs 228 are illustrated. The other receiver peg 228 for each pair of long arm receiver pegs 228 is "cut off" by the cross section. Each long arm 118 of the stud 110 is trapped between a shoulder 247 of a long arm receiver peg 228 and the roof 229 of the charm opening 223. Small portions of two short arm receiver pegs 226 are illustrated. The short arm receiver pegs 226 are separated from the long arm receiver pegs 228 by long-short peg space 247.

FIG. 19 illustrates the stud 110 inserted into charm 220. The underside 221 of the charm 220 is illustrated. The view of the arms 116, 118 of the stud 110 is obstructed by the bottom 119 of the base 114 of the stud 110. The view of the short arm receiver pegs is also obstructed. A portion of each long arm receiver peg 228 is visible, as are their beveled edges 251.

Figure 16:
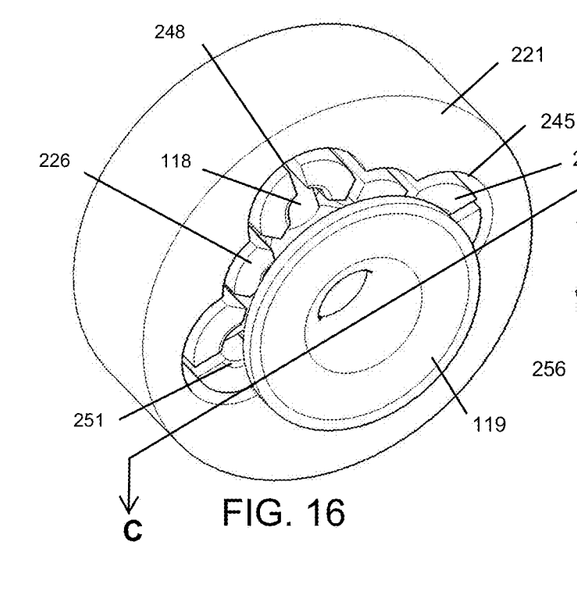
FIG. 16 is an isometric view of the underside of a stud and an alternative embodiment of the charm of the invention, showing the stud and charm connected.

FIG. 16 illustrates the stud 110 inserted into the charm 220 from an isometric view underneath the stud 110 and charm 220. Due to obstruction by the base 114, the short arms 116 of the stud 110 are not visible from this perspective. A long arm 118 is visible, being held in place by long arm receiver pegs 228. Other long arm receiver pegs 228 are illustrated, as are several short arm receiver pegs 226. The peg lateral deformation space 245 is illustrated, as are long-short peg spaces 247 and long peg separation spaces 248.

Figure 17:
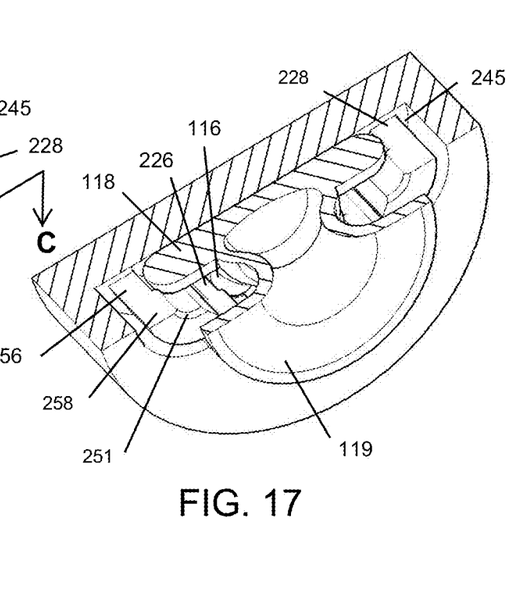
FIG. 17 is an isometric cross-section view of the underside of a stud and an alternative embodiment of the charm of the invention, showing the stud and charm connected, taken along the C-C line of FIG. 16.

FIG. 17 is a cross-section of FIG. 16 taken along the line C-C. The stud 110 and underside 221 of the charm 220 are illustrated. Two long arms 118 extend from the stud 110. The long arms 118 are trapped between the shoulders 247 of the long arm receiver pegs 228 and the roof 229 of the charm opening 223. As in FIG. 20, one of the pair of long arm receiver pegs 228 is visible. A portion of one of the short arms 116 of the stud 110 is illustrated.

FIG. 17 also illustrates the upper portion 258 and lower portion 256 of the long arm receiver pegs 228, as well as the peg lateral deformation space 245. Due to the perspective of FIG. 17, the peg lateral deformation space 245 is shown separating only the long arm receiver pegs 228 from the underside 221 of the charm 220. However, as illustrated in FIG. 15, the peg lateral deformation space 245 also separates the short arm receiver pegs 226 from the underside 221 of the charm 220.

Figure 21:
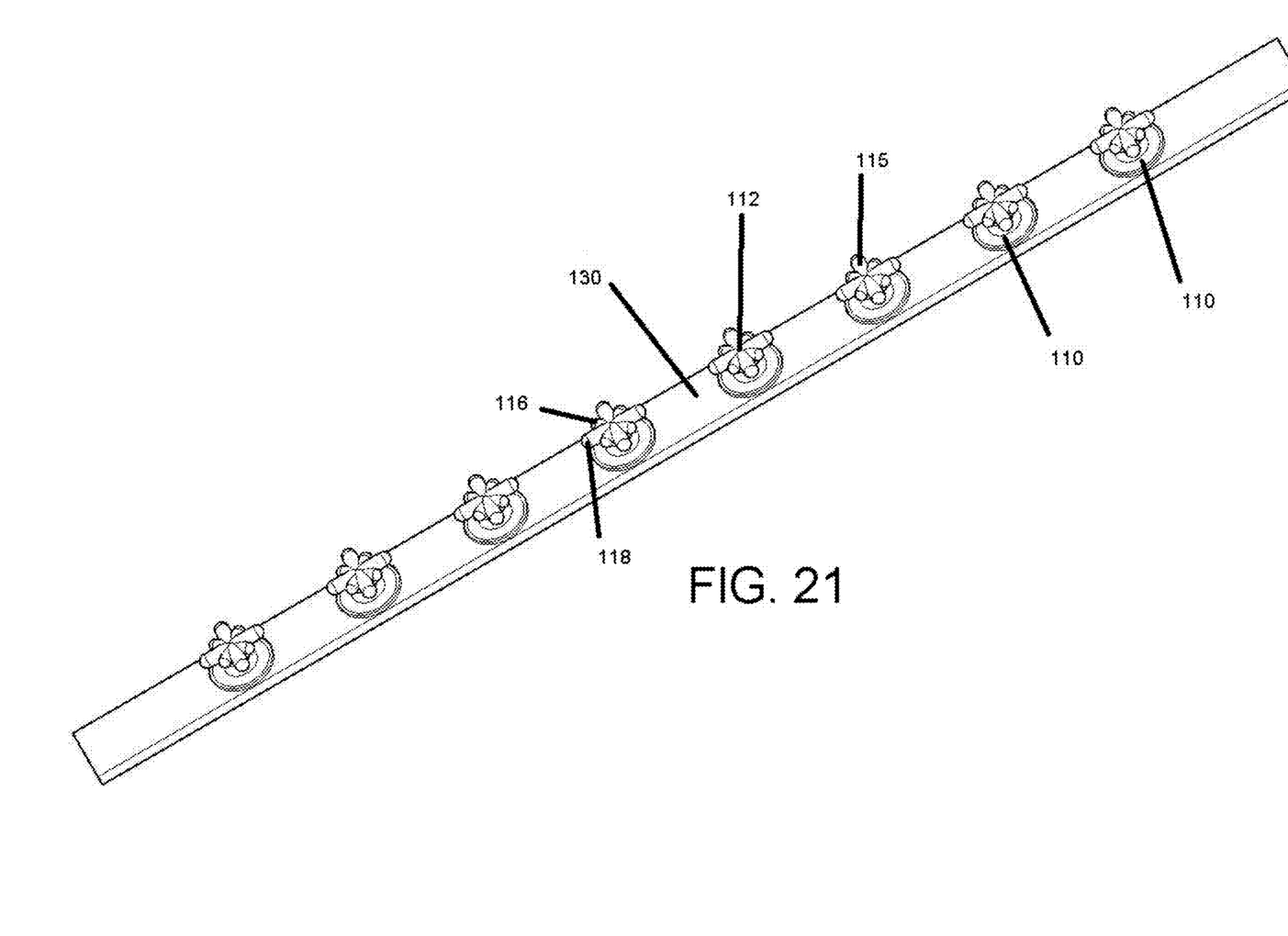
FIG. 21 is an isometric overhead view of a strap and studs of the invention.

FIG. 21 illustrates a strap 130 for a charm bracelet embodying the invention. The strap 130 is made of leather, textile, plastic, rubber, or polyvinyl chloride in sizes appropriate to fit on a human wrist. Several studs 110 are illustrated. They are attached to the strap 130 and extend upward from the strap 130 and away from the wearer's wrist. Although eight studs 110 are illustrated, in alternative embodiments, there can be any number of studs 110 consistent with the comfort and use of the wearer, including one. The strap 130 can be secured to a wearer's wrist by any conventional means in the art.

A user may snap the charm 120, 220 to the bracelet before placing the bracelet on a wrist or place the bracelet on the wrist before attaching a charm 120, 220. The user does not need to remove the bracelet from the wrist before detaching a charm 120, 220, although the user may choose to do so, if desired.

The stud 110 may be attached to objects, such as straps for flip-flops and backpacks. The stud 110 may be attached to any object that does not interfere with the operation of the stud 110 and charm 120, 220 attachment.

The reader should understand that variations of the embodiments described above and illustrated herein may be produced in accordance with the spirit and scope of the present invention, as defined by the appended claims.

The invention claimed is:

1. A snap charm comprising
   a) a stud comprising a stud body and a stud head, the stud head being formed of eight arms extending from the stud body in the shape of an eight-pointed star, and
   b) a charm having two sides comprising a one side and an other side
      wherein a receiver on the one side is formed in the shape of an eight-pointed star,
      wherein the charm is attached to the stud by bringing the receiver and the stud head together into mating engagement;
      wherein four of the arms are longer than the other four arms; and
      wherein the four long arms extend from the body of the stud at regular angles to one another,
      wherein the four short arms extend from the body of the stud at regular angles to one another,
      and wherein each long arm extends between two short arms and each short arm extends between two long arms.

2. The snap charm of claim 1, wherein the receiver defines a charm opening, further comprising
   c) eight long arm pegs disposed within the charm opening, each long arm peg having an inner long arm edge and an outer long arm edge,
      the long arm pegs being disposed in pairs such that the inner long arm edges of each long arm peg of each pair surround and define long arm peg spaces, and
   d) four short arm pegs disposed within the charm opening, each short arm peg having two lateral short arm ends,
   wherein each outer long arm edge is proximate to one lateral short arm end,
   and wherein the outer long arm edges and lateral short arm edges surround and define long-short peg spaces, adapted to matingly engage the arms of the stud.

3. The snap charm of claim 2, wherein at least some of the pegs have shoulders configured to trap the arms of the stud and thereby keep the stud within the charm once the stud has been inserted.

4. The snap charm of claim 1, wherein the stud is made of rigid material and the receiver is made of deformable material.

5. The snap charm of claim 4, wherein the deformable material of the receiver is soft plastic or a rubbery material.

6. The snap charm of claim 4, wherein the rigid material of the stud is hard plastic.

7. A snap charm bracelet comprising
   a) a strap,
   b) at least one stud attached to the strap, the at least one stud comprising a stud body and a stud head, the stud head being formed of eight arms extending from the stud body in the shape of an eight-pointed star, and
   c) at least one charm having a one side and an other side
      wherein a receiver on the one side is formed in the shape of an eight-pointed star,
   wherein a wearer can attach via mating engagement the at least one charm to the at least one stud by bringing the receiver and the stud together
   wherein the receiver of each charm defines a charm opening, further comprising
   d) eight long arm pegs disposed within the charm opening, each long arm peg having an inner long arm edge and an outer long arm edge,
      the long arm pegs being disposed in pairs such that the inner long arm edges of each long arm peg of each pair surround and define long arm peg spaces, and
   e) four short arm pegs disposed within the charm opening, each short arm peg having two lateral short arm ends,
   wherein each outer long arm edge is proximate to one lateral short arm end,
   and wherein the outer long arm edges and lateral short arm edges surround and define long-short peg spaces adapted to matingly engage the arms of the stud.

8. The snap charm bracelet of claim 7, wherein a plurality of studs are attached to the strap, and each of the studs is configured and sized to be matingly engaged with any of a plurality of charms.

9. The snap charm bracelet of claim 7, wherein at least some of the pegs of each charm have shoulders configured to trap the arms of the stud and thereby keep the stud within the charm once the stud has been inserted.

* * * * *